United States Patent Office 3,194,843
Patented July 13, 1965

3,194,843
REACTIVATION OF CATALYST IN PRODUCTION OF A PHENOL
Alvin D. Silber, Riverdale, N.Y., and Jack B. Feder, Dumont, and Joseph L. Russell, Ridgewood, N.J., assignors to Halcon International, Inc., a corporation of Delaware
No Drawing. Filed Apr. 11, 1961, Ser. No. 102,140
4 Claims. (Cl. 260—621)

This invention relates to a process for preparing phenol, and more particularly to a process for converting an impure oxygenated cyclohexane cut or fraction to pure phenol in high yields by catalytic dehydrogenation and distillation, and especially to such a process wherein spent catalyst is regenerated by removing water-soluble material therefrom.

Phenol is a very important industrial chemical. It may be prepared by catalytically dehydrogenating cyclohexanone, cyclohexanol or mixtures of the two. However, catalyst life is poor when impure starting materials are used. The art is confronted by the problem of obtaining pure phenol in improved yields and in an economical manner, especially from impure oxygenated cyclohexane material.

The discoveries associated with the invention relating to solution of the above problems and the objects achieved in accordance with the invention as described herein include the provision of:

A process for regenerating a spent metal on carbon dehydrogenation catalyst which comprises removing therefrom water-soluble material or material soluble in a liquid boiling in the range of 20° to 250° C.;

Such a process wherein the spent catalyst is leached with water, until the leachings are free of organic material;

Such a process wherein the treating temperature is within the range between the freezing and boiling temperature of the system, preferably at 70° C. or above;

Such a process wherein the metal is platinum, the treating is with separate boilings with water until the separated water is free of organic acid;

Such a process including preparing phenol from a crude oxygenated cyclohexane fraction containing at least one member of the group consisting of cyclohexanone and cyclohexanol by vaporizing this fraction and diluting it with hydrogen in an amount in the range of 1 to 15 mols of hydrogen per mol of total cyclohexanone and cyclohexanol therein, and contacting the resulting mixture with a platinum on carbon catalyst at a temperature in the range of 250° to 425° C. at a liquid space velocity in the range of 0.3 to 2.5 per hour and recovering phenol from the reaction product, the contacting being stopped when the catalyst is spent, and regenerating the spent catalyst;

and other objects which will be apparent in view of details or embodiments of the invention as set forth hereinafter.

In order to indicate still more fully the nature of the present invention, the following examples of typical procedures are set forth, in which parts and percent mean part and percent by weight, respectively, unless otherwise indicated, it being understood that these examples are presented as illustrative only and are not intended to limit the scope of the invention.

*Example*

A 1 to 1 mixture of pure cyclohexanone and pure cyclohexanol is vaporized and dehydrogenated using a 2% platinum-on-carbon catalyst. The feedstock is diluted with 4 to 8 mols of hydrogen per mol of total cyclohexanone and cyclohexanol present. The mixture is contacted with the catalyst at 375° C. and a liquid space velocity of 0.7 per hour. The molar conversion to phenol is 98%.

Then the feedstock is changed to an impure cyclohexanol (obtained from cyclohexane by air oxidation), and the molar conversion to phenol drops to 75%. Changing back to the the pure feedstock now gives a 75% molar conversion to phenol.

The catalyst is removed from the reactor, and given six successive boilings, each in 10 times its weight of distilled water for a one hour period. Between each boiling the water is separated from the catalyst, and replaced by an equal amount of distilled water. The separated water from each of the last two stages is substantially free of organic matter including titratable acidic matter.

Then the catalyst is dried overnight at 120° C., loaded into the reactor, treated with hydrogen at 375° C. for 16 hours, and used for dehydrogenating pure feedstock under the above described conditions. The results obtained are similar to those obtained with fresh catalyst, showing that the catalyst is regenerated or reactivated by this treatment.

Cyclohexane is subjected to an air oxidation at 150° C. and superatmospheric pressure in the presence of a cobalt naphthenate catalyst so as to give a reaction mixture in which about 10% of the cyclohexane is oxidized. After removal of unreacted cyclohexane, the reaction mixture is vacuum distilled and a cut is obtained as a charge stock for dehydrogenation. This cut contains about 85% of cyclohexanone plus cyclohexanol. Dehydrogenation is accomplished using a 2% platinum-on-carbon catalyst to produce a crude phenol. Pure phenol is recovered therefrom by distillation. The distillation apparatus used may be a one-inch diameter, vacuum jacketed, 20 actual plate glass column (Oldershaw) equipped with a time switch operated magnetic reflux splitter condensing head of conventional design, a jacketed distillate receiver, a batch pot and heating mantle, and a vacuum pump and mercury U-tube manometer.

Pure phenol (exceeding the U.S.P. freeze point specification) is obtained from the above mentioned product by vacuum distillation in a 30 plate column of the above described type further equipped with a condensing head having a decanter tube (Dean-Stark), using a reflux ratio of 33 to 1, a pot temperature of about 113° C., and a head temperature of 99° C.

Although water is the preferred solvent or treating agent, other equivalent solvents or agents may be used, e.g. ethanol, methanol, isopropanol, cyclohexanone, acetone, methyl ethyl ketone, acetic acid, and the like.

The process may be carried out in a batch, a semi-continuous, or a continuous (sequential) manner.

Regeneration in accordance with the invention is equally applicable to other spent metal-dehydrogenation catalysts supported on carbon or the like, including palladium, tone, methyl ethyl ketone, acetic acid, and the like.

The spent catalysts may have been used for converting cyclohexanol and cyclohexanone to phenol, or analogously dehydrogenating methyl cyclohexanol and methyl cyclohexanone to cresols, and generally, alkyl cyclohexanols and alkyl cyclohexanones to corresponding alkyl phenols.

The regeneration may be carried out without removing the catalysts from the reactor providing the latter is not adversely affected by the treating agent or solvent, e.g., if the surfaces contacted by the boiling solvent are corrosion resistant.

The solvent or agent may be a liquid material boiling in the range of 20° to 250° C. The dehydrogenation step is carried out in the presence of (added) hydrogen, with the feedstock in the vapor phase, using a dehydrogenation catalyst. The mixture of hydrogen, cyclohexanol and cyclohexanone is contacted with the dehydrogenation catalyst, such as 0.5 to 5% platinum on carbon or equivalent material, in a zone maintained at a temperature in the range of from about broadly 250° to 425° C. desirably 325° to 400° C. and preferably 340° to 385° C., at a liquid hourly space velocity of broadly from about 0.3 to 2.5, desirably 0.6 to 1 and preferably 0.7 to 0.8. The mol ratio of hydrogen is in the range of 1 to 15, and desirably 4 to 8 mols of hydrogen per mol of total cyclohexanol and cyclohexanone. Under these conditions there is little or no production of either benzene or cyclohexene. When the activity of the catalyst drops to an economically undesirable level, it is reactivated.

The process of this invention is adapted for use in connection with the overall process for the preparation of phenol from cyclohexane or benzene, e.g. as set forth more fully in the U.S. patent application of Alfred Saffer and Rex E. Lidov Serial No. 29,816, filed on May 18, 1960, and now abandoned, or the phenol distillation may be carried out in two steps, phenol and lower boiling material being separated from the higher boiling in the first step, and lower boiling material being separated from the phenol in the second, as set forth more fully in the U.S. patent application of Jack B. Feder and Joseph L. Russell, Serial No. 35,127, filed on June 10, 1960, now U.S. Patent 3,140,243 issued July 7, 1964.

In view of the foregoing disclosures, variations and modifications thereof will be apparent to one skilled in the art and it is intended to include within the invention all such variations and modifications except as do not come within the scope of the appended claims.

What is claimed is:

1. A process for the regeneration of a spent metal-on-carbon catalyst previously used in the vapor phase dehydrogenation of a compound selected from the group consisting of cyclohexanol, cyclohexanone, alkyl cyclohexanol, alkyl cyclohexanone, and mixtures to produce the corresponding phenol which comprises leaching the spent catalyst with water until the leachings are free of organic material, and recovering regenerated catalyst.

2. The process of claim 1 wherein the spent catalyst is leached with the water at a temperature in the range of about 70° C. to the boiling temperature of the system.

3. The process of claim 1 wherein the spent catalyst is leached with the water at the boiling temperature of the system.

4. A process for the preparation of phenol from a crude oxygenated cyclohexane fraction containing at least one member of the group consisting of cyclohexanol and cyclohexanone which comprises vaporizing said fraction, diluting said fraction with hydrogen in an amount in the range of 1 to 15 mols of hydrogen per mol of total cyclohexanone and cyclohexanol, contacting the resulting mixture with a platinum-on-carbon catalyst at a temperature in the range of 250 to 425° C. at a liquid hourly space velocity in the range of 0.3 to 2.5 per hour and recovering phenol from the reaction product, discontinuing said contacting when the catalyst is spent, leaching the spent catalyst with water until the leachings are free of organic material, separating said catalyst and reusing the thusly treated catalyst in the further production of phenol.

References Cited by the Examiner

UNITED STATES PATENTS 2,503,641  4/50  Taylor et al. _____ 260—621
2,863,917  12/58  Rucker et al. _____ 252—420

LEON ZITVER, *Primary Examiner.*

CHARLES B. PARKER, HAROLD G. MOORE,
*Examiners.*

UNITED STATES PATENT OFFICE
CERTIFICATE OF CORRECTION

Patent No. 3,194,843

July 13, 1965

Alvin D. Silber et al.

It is hereby certified that error appears in the above numbered patent requiring correction and that the said Letters Patent should read as corrected below.

Column 2, line 57, strike out "tone, methyl ethyl ketone, acetic acid, and the like." and insert instead -- ruthenium, rhodium, nickel, cobalt and the like. --.

Signed and sealed this 28th day of December 1965.

(SEAL)
Attest:

ERNEST W. SWIDER
Attesting Officer

EDWARD J. BRENNER
Commissioner of Patents